US009333572B2

(12) United States Patent
McDonough et al.

(10) Patent No.: US 9,333,572 B2
(45) Date of Patent: May 10, 2016

(54) MULTI-PURPOSE TOOL AND TENSION MECHANISM

(75) Inventors: James M. McDonough, Bradford, PA (US); Howard Tripp, Plymouth, MN (US); Neal Barnes, Minneapolis, MN (US); Brian J. Barber, Cyclone, PA (US)

(73) Assignee: Zippo Manufacutring Company, Bradford, PA (US)

( * ) Notice: Subject to any disclaimer, the term of this patent is extended or adjusted under 35 U.S.C. 154(b) by 132 days.

(21) Appl. No.: 13/476,148

(22) Filed: May 21, 2012

(65) Prior Publication Data

US 2013/0283540 A1 Oct. 31, 2013

Related U.S. Application Data

(60) Provisional application No. 61/639,298, filed on Apr. 27, 2012.

(51) Int. Cl.
| | | |
|---|---|---|
| *B23D 45/00* | (2006.01) | |
| *B27B 23/00* | (2006.01) | |
| *B27B 21/02* | (2006.01) | |
| *B27B 21/00* | (2006.01) | |
| *B23D 43/00* | (2006.01) | |
| *B23D 51/12* | (2006.01) | |
| *B27B 21/06* | (2006.01) | |
| *B25F 1/02* | (2006.01) | |

(52) U.S. Cl.
CPC .............. *B23D 51/125* (2013.01); *B25F 1/02* (2013.01); *B27B 21/02* (2013.01); *B27B 21/06* (2013.01)

(58) Field of Classification Search
CPC ....... B23D 51/125; B27B 21/02; B27B 21/06

USPC ........... 30/392, 166.3, 506–507, 513; D8/64, D8/95–98
See application file for complete search history.

(56) References Cited

U.S. PATENT DOCUMENTS

| 1,882,328 | A | * | 10/1932 | Kinkel | ............................. | 83/835 |
| 2,101,362 | A | * | 12/1937 | Davidson | ........................ | 30/508 |
| 2,102,782 | A | * | 12/1937 | Blum | ............................... | 30/513 |

(Continued)

FOREIGN PATENT DOCUMENTS

| CN | 201002144 | 1/2008 |
| CN | 201500822 | 6/2010 |

(Continued)

OTHER PUBLICATIONS

European Search Report application No. 13165177.0 dated Jul. 18, 2013.

*Primary Examiner* — Ghassem Alie
*Assistant Examiner* — Bharat C Patel
(74) *Attorney, Agent, or Firm* — Hodgson Russ LLP

(57) ABSTRACT

A tool is provided. The tool may include a handle, a frame, and a removable saw blade including at least one hole on one end thereof and at least one hole on another end thereof. The tool may also include a compensating clip configured to attach the removable saw blade to the frame and to provide tension for the removable saw blade. The compensating clip may include a plate including a clip hook, and the plate further includes an opening where a compensator spring is provided. The clip hook is configured to attach onto the at least one hole of the removable saw blade to attach the saw blade to the frame.

14 Claims, 6 Drawing Sheets

(56) References Cited

U.S. PATENT DOCUMENTS

| | | | |
|---|---|---|---|
| 2,213,841 A * | 9/1940 | Hubeck | 30/513 |
| 2,253,440 A * | 8/1941 | Martin | 30/508 |
| 2,519,904 A | 8/1950 | Hendricksen et al. | |
| 2,576,869 A | 11/1951 | Woltemath | |
| 3,589,418 A * | 6/1971 | Clark | 30/513 |
| 4,367,779 A * | 1/1983 | Ewig | 30/506 |
| 4,466,471 A * | 8/1984 | Thomson | 30/517 |
| 5,025,905 A * | 6/1991 | Lenz | 477/209 |
| 5,271,158 A | 12/1993 | Chen | |
| 5,388,333 A * | 2/1995 | Chen | 30/508 |
| 5,542,139 A * | 8/1996 | Boivin | 7/118 |
| 5,706,583 A * | 1/1998 | Gengenbach | 30/166.3 |
| 5,722,173 A * | 3/1998 | Huang | 30/510 |
| 6,070,330 A | 6/2000 | Phelon et al. | 30/513 |
| 6,134,791 A * | 10/2000 | Huang | 30/513 |
| 6,266,887 B1 * | 7/2001 | Owens et al. | 30/513 |
| 6,457,244 B1 * | 10/2002 | Huang | 30/513 |
| 6,662,681 B2 * | 12/2003 | Crane et al. | 74/571.1 |
| 6,729,030 B2 * | 5/2004 | Huang | 30/513 |
| 6,742,268 B2 * | 6/2004 | Chen | 30/519 |
| 6,772,522 B1 * | 8/2004 | Huang et al. | 30/513 |
| 6,916,106 B2 * | 7/2005 | Xingguo | 362/253 |
| 6,925,720 B2 * | 8/2005 | Ranieri | 30/513 |
| 7,174,644 B2 * | 2/2007 | Critelli et al. | 30/512 |
| 7,254,893 B1 * | 8/2007 | Huang | 30/512 |
| 8,033,199 B1 * | 10/2011 | Noble | 81/23 |
| 8,555,517 B2 * | 10/2013 | Scott et al. | 30/506 |
| 2003/0056377 A1 * | 3/2003 | Huang | 30/513 |
| 2003/0229995 A1 * | 12/2003 | Huang | 30/513 |
| 2004/0020062 A1 * | 2/2004 | Ducret | 30/512 |
| 2004/0074099 A1 * | 4/2004 | Chen | 30/507 |
| 2005/0044731 A1 * | 3/2005 | Ranieri | 30/513 |
| 2009/0113729 A1 * | 5/2009 | Chen | 30/513 |

FOREIGN PATENT DOCUMENTS

| | | |
|---|---|---|
| DE | 202 04 158 U1 | 5/2002 |
| DE | 202007015510 | 5/2008 |
| TW | 537086 | 6/2003 |

* cited by examiner

FIG.1 (perspective)

FIG.2 (front)

MULTI-PURPOSE TOOL AND TENSION MECHANISM

CROSS REFERENCE TO RELATED APPLICATIONS

This application claims priority to U.S. provisional application No. 61/639,298, filed on Apr. 27, 2012. The contents of this earlier filed application are hereby incorporated by reference in its entirety.

BACKGROUND

1. Field

Embodiments of the invention relate to a multi-purpose tool which may include a saw, axe, mallet, and stake puller, and to a tension mechanism therefor.

2. Description of the Related Art

Outdoor tools can be used for a variety of tasks, such as cutting, sawing, chopping, woodworking, building, etc. One common outdoor tool is a bow saw used for sawing a workpiece such as a tree branch. Bow saws generally have a metal frame in the shape of a bow and a coarse wide blade attached to a handle. Another common tool is an axe, which is generally used to shape, split and cut wood or to harvest timber, for example. An axe may have many forms and uses, but generally includes an axe head with a handle, or helve. Another common tool is a mallet, which may be considered as a kind of hammer. Mallet heads are relatively large and are usually made of rubber, but can sometimes be made of wood, for example. A stake puller, as suggested by its name, is an outdoor tool that can be used to pull wooden or metal stakes from the ground.

SUMMARY

One embodiment is directed to a tool. The tool may include a handle, a frame, and a removable saw blade including at least one hole on one end thereof and at least one hole on another end thereof. The tool may also include a compensating clip configured to attach the removable saw blade to the frame and to provide tension for the removable saw blade. In one embodiment, the compensating clip includes a plate including a clip hook, and the plate further includes an opening where a compensator spring is provided. According to certain embodiments, the clip hook is configured to attach into the at least one hole of the removable saw blade to attach the saw blade to the frame.

Another embodiment is directed to a tool, which includes handle means for gripping the multi-purpose tool, blade means for cutting objects, the blade means including at least one hole on one end thereof and at least one hole on another end thereof. The tool further includes frame means for supporting the blade means, and compensating means for attaching the blade means to the frame means and for providing tension for the blade means. The compensating means includes a plate including an attaching means for attaching to the blade means. The plate further includes an opening and a compensator spring is provided in the opening of the plate, and the attaching means is configured to attach into the at least one hole of the blade means.

Another embodiment includes a method of tensioning a blade on a saw. The method includes providing a frame, providing a removable saw blade including at least one hole on one end thereof and at least one hole on another end thereof, and providing tension for the removable saw blade by a compensating clip configured to attach the removable saw blade to the frame. The compensating clip may include a resilient means.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of a multi-purpose tool and tension mechanism for the multi-purpose tool, as represented in the attached figures, is not intended to limit the scope of the invention, but is merely representative of selected embodiments of the invention.

If desired, the different components discussed below may be optional, may be re-configured, or may be combined. As such, the following description should be considered as merely illustrative of the principles, teachings and embodiments of this invention, and not in limitation thereof.

Figure 1:
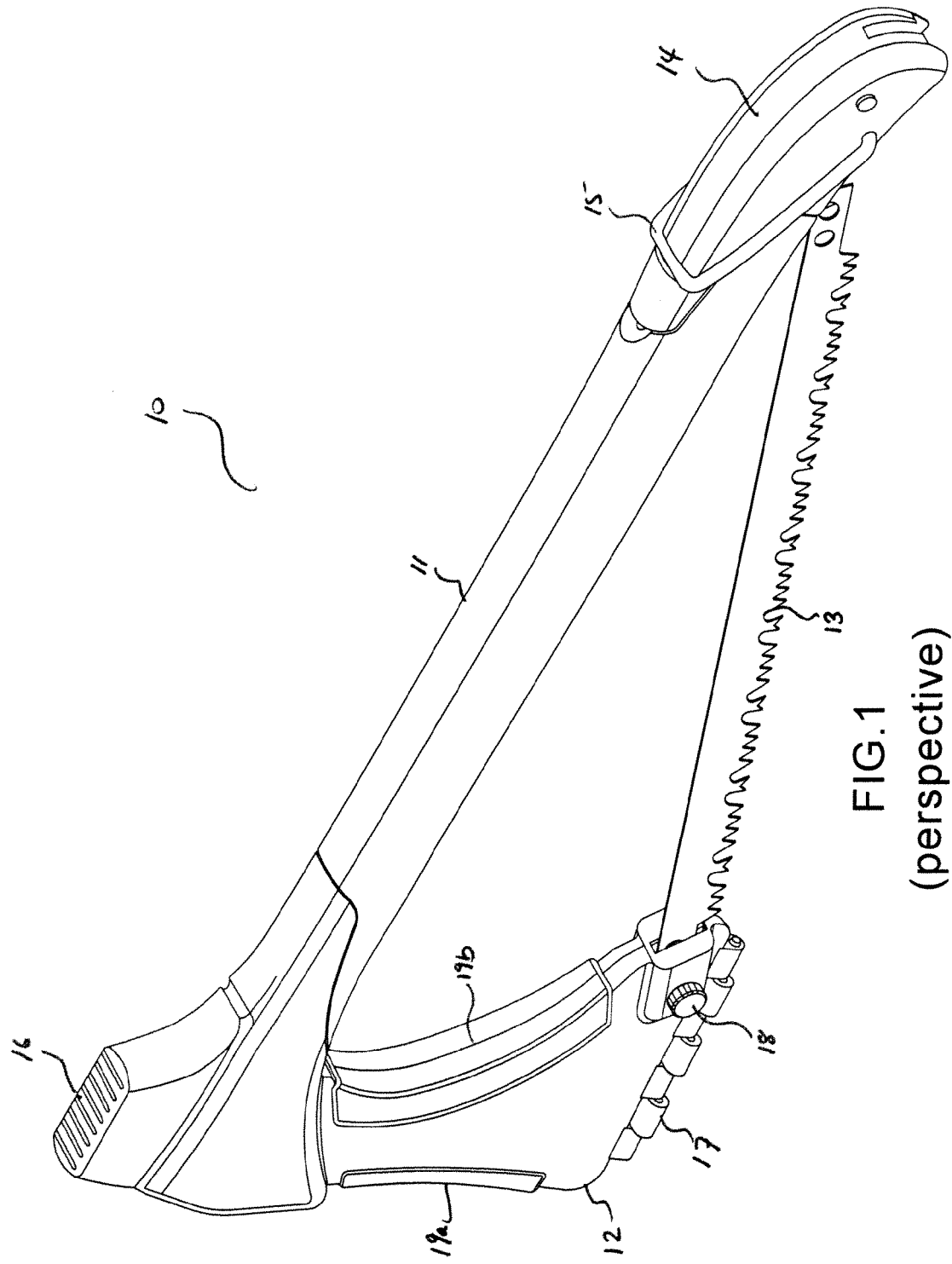
FIG. 1 illustrates a perspective view of the multi-purpose tool, according to one embodiment.

One embodiment is directed to a multi-purpose device or tool that can include a saw, axe, mallet, and/or stake puller. FIG. 1 illustrates a perspective view of the multi-purpose tool 10, according to one embodiment. As illustrated in FIG. 1, in this example, the multi-purpose tool 10 includes a handle 12 connected to a frame 11. The handle 12 can include cushions 19a and 19b on either side thereof. In certain embodiments, a bale 14 and stake puller 15 may be attached to one end of the frame 11. Additionally, when the multi-purpose tool 10 is used as a saw, a removable saw blade 13 may be connected to the handle and frame 11, as discussed in more detail below. A mallet 16 may be provided on one end of the frame 11. The multi-purpose tool 10 may also include a hinge 17 and pin 18 that will be discussed in more detail below.

In one embodiment, the frame 11 may include a cavity or channel that provides space to store one or more saw blades, such as removable saw blade 13, when they are not in use.

Figure 2:
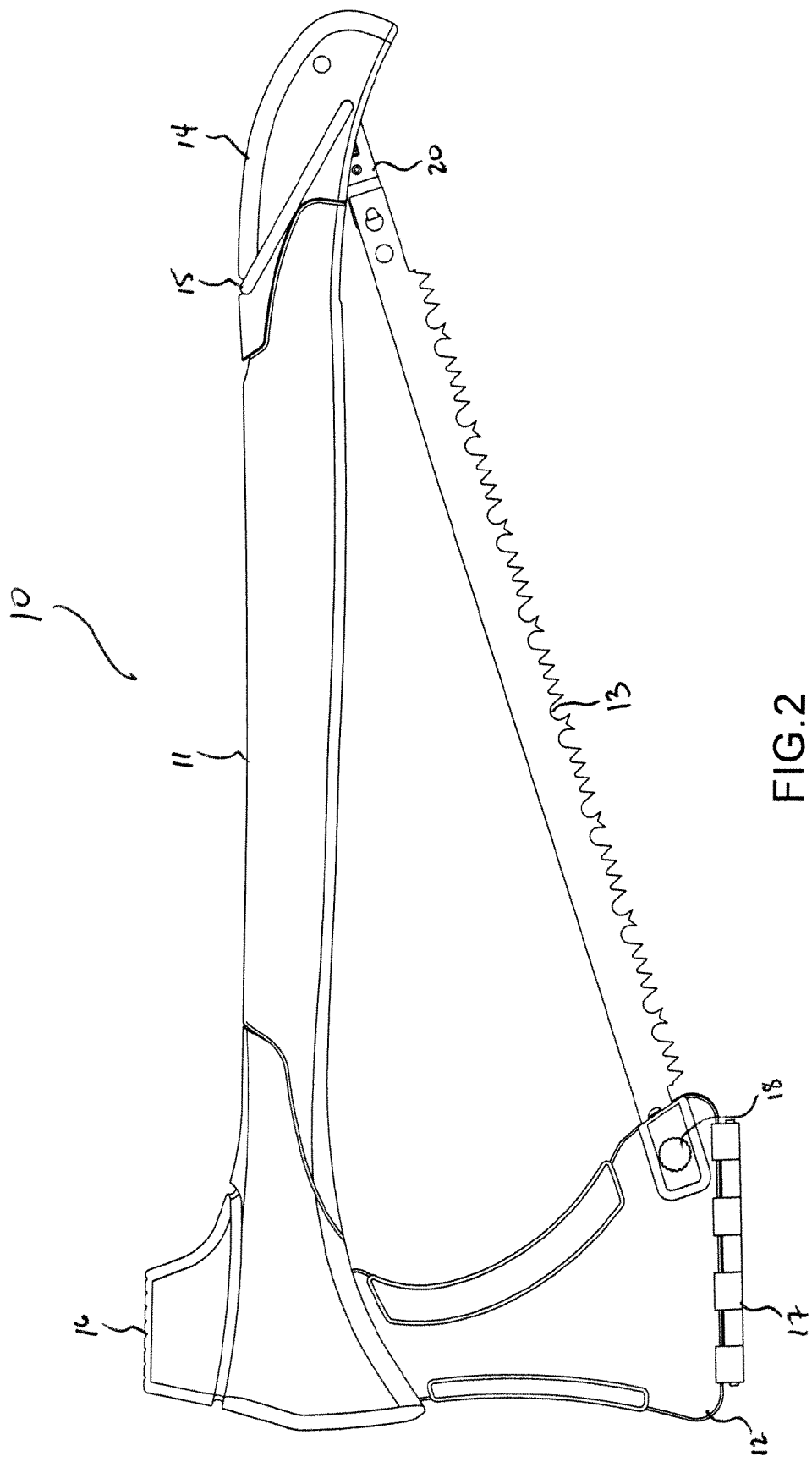
FIG. 2 illustrates a side view of the multi-purpose tool, according to one embodiment.

FIG. 2 illustrates a side view of the multi-purpose tool 10, including handle 12, mallet 16, frame 11, bale 14, and stake puller 15, according to one embodiment. As illustrated in FIG. 2, the multi-purpose tool 10 may include a compensating clip 20 configured to attach the removable saw blade 13 to the frame 11 of the multi-purpose tool 10. The components and function of the compensating clip 20 will be discussed in more detail below. As also illustrated in FIG. 2, handle 12 may include a hinge 17 and pin 18. In some embodiments, the pin 18 is configured to attach the removable saw blade 13 to the handle 12 of the multi-purpose tool 10. According to an embodiment, the pin 18 may be any means or mechanism for securing saw blade 13 onto axe blade 50 by being fastened into lower portion 12b.

Figure 3:
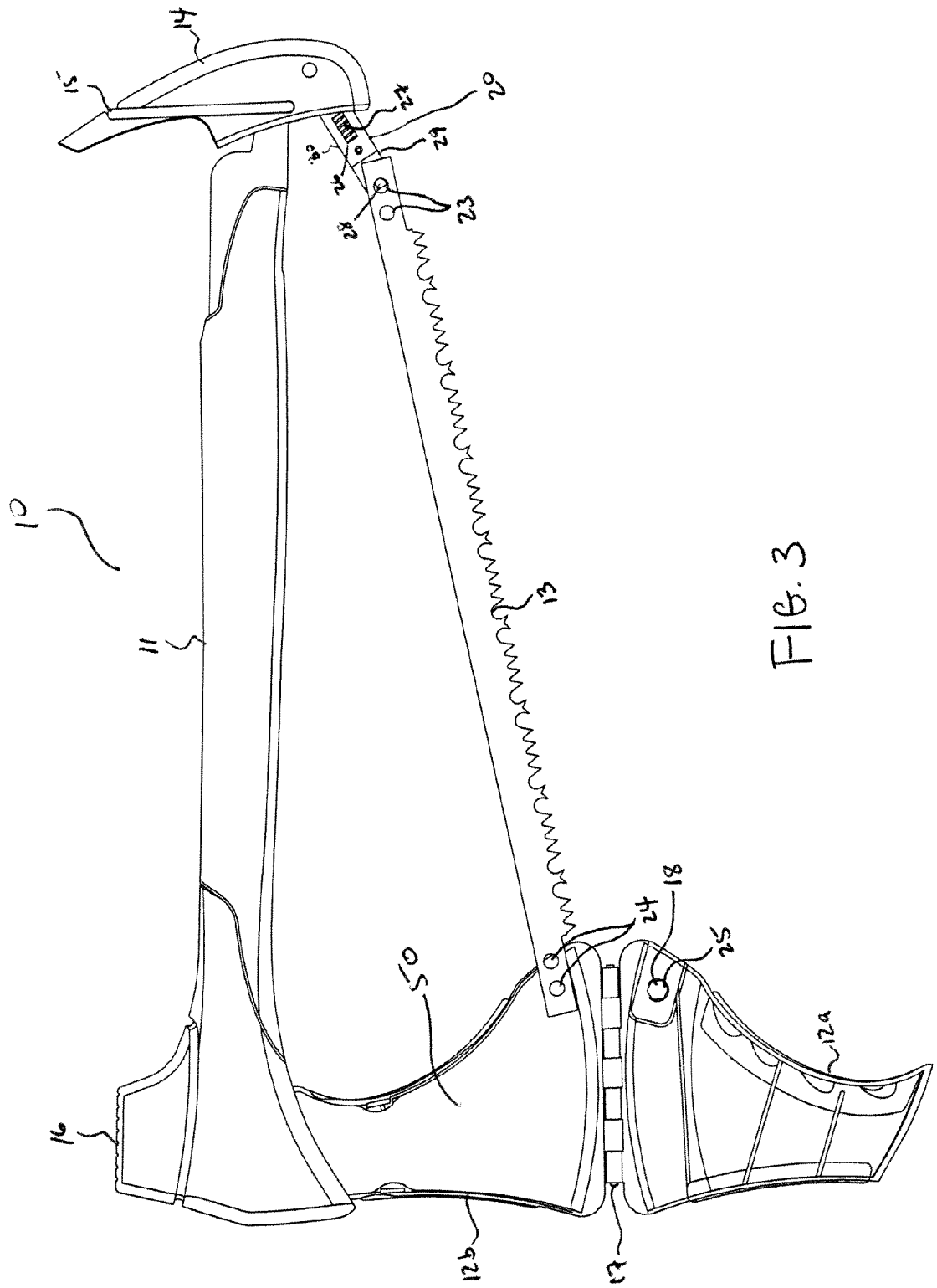
FIG. 3 illustrates another side view of the multi-purpose tool with portions in an open position, according to an embodiment.

FIG. 3 illustrates an example of the multi-purpose tool 10 with the handle 12 and bale 14 in open positions. As illustrated in FIG. 3, the handle 12 may include an upper portion 12a and a lower portion 12b. The multi-purpose tool 10 may also include an axe blade 50 situated between the upper portion 12a and lower portion 12b. As a result, the handle 12 may act as a cover or sheath for the axe blade 50. In an embodiment, when the multi-purpose tool is used as an axe, the upper portion 12a and lower portion 12b of the handle may be completely removed to expose the axe blade 50, and the frame 11 may be used as handle for gripping and swinging the axe. The upper portion 12a and lower portion 12b of handle 12 may be attached to each other via hinge 17 such that the upper portion 12a may swing open away from lower portion 12b and away from axe blade 50, as shown in FIG. 3.

Further, as illustrated in FIG. 3, the removable saw blade 13 may include one or more holes 24 on one thereof and one or more holes 23 on another end thereof. When in the open position, one end of the removable saw blade 13 can be placed onto axe blade 50 and secured by the pin 18 inserted in the upper portion 12a and the upper portion 12a may be rotated via hinge 17 into a closed position, as illustrated above in FIGS. 1 and 2. More specifically, in an embodiment, the removable saw blade 13 may be secured within the handle 12 by the pin 18 that can be passed through a hole 25 in the upper portion 12a, through the at least one hole 24 in the removable saw blade 13, through axe blade 50, and fastened into lower portion 12b, thereby securing the removable saw blade 13 to the handle 12.

According to an embodiment, the pin 18 may be any means or mechanism for securing saw blade 13 onto axe blade 50 by being t fastened into lower portion 12b.

In addition, the bale 14 may be swingably attached to the frame 11 such that the bale 14 may rotate in the longitudinal direction of the frame to an open position shown in FIG. 3. In an embodiment, the stake puller 15 may be attached to the bale 14 and may rotate with bale 14 while in its closed position. The closed position of the bale 14 is shown in FIGS. 1 and 2 discussed above.

As also illustrated in FIG. 3, the multi-purpose tool 10 may include a compensating clip 20 attached to the bale 14, which is located on an end of the frame 11 opposite from the handle 12. The compensating clip includes a center section 29 including plate that is integral with a clip hook 28. The center section 29 may also include an opening or window 26 in which a compensator spring 27 is located. The compensating clip may also include a retention structure 30 covering the center section 29. In one embodiment, the retention structure 30 is a bracket. In some embodiments, the bracket may be a U-shaped bracket.

In one embodiment, the clip hook 28 may engage onto the at least one hole 23 on one end of the removable saw blade 13 in order to attach the removable saw blade to the frame 11 and bale 14. For example, according to one embodiment, when the removable saw blade 13 is to be attached to the bale 14, the bale 14 is moved to the open position illustrated in FIG. 3 in order to release the compensating clip from the storage position inside the bale 14. One of the holes 23 on one end of the removable saw blade 13 may then be placed over the clip hook 28 of the compensating clip 20. The bale 14 may then be moved to the locked position integral with the frame 11, as illustrated in FIGS. 1 and 2, such that the compensating clip 20 via the compensator spring 27 provides the tension to lock the saw blade 13 into place for proper use. As a result, in one embodiment, the compensating clip 20 including the compensator spring 27 is configured as a tension mechanism to provide the appropriate tension onto the removable saw blade 13.

It should be noted that, while FIG. 3 depicts the compensator spring 27 as a coiled compression spring, embodiments are not limited to such a spring. Spring 27 may be made up of any structure(s), component(s), or materials that can provide resiliency from compression and elongation. For example, spring 27 may be a thin piece of metal capable of flexing, or an elastomeric element that compresses and rebounds In one embodiment, the removable saw blade 13 is attached onto the handle 12 first, and then is attached to the bale 14 by means of the compensating clip 20. The bale 14 is then closed to apply the tension onto the removable saw blade 13, and the compensator spring 27 compensates for any tolerances.

According to certain embodiments, the compensator spring 27 is able to overcome manufacturing tolerances in the saw blades resulting from production lot variations, different blade manufacturers, and tolerances in the manufacture of the multi-purpose tool 10. As a result, in some embodiments, the frame 11 can be made rigid since the multi-purpose tool 10 does not rely on the frame 11 to flex in order to provide appropriate tension for the saw blade 13. It should be noted that, typically, many saws do rely on their frames to flex in order to provide the tension and may include screw adjustment mechanisms or other adjustment means that require manual interaction.

Figure 4:
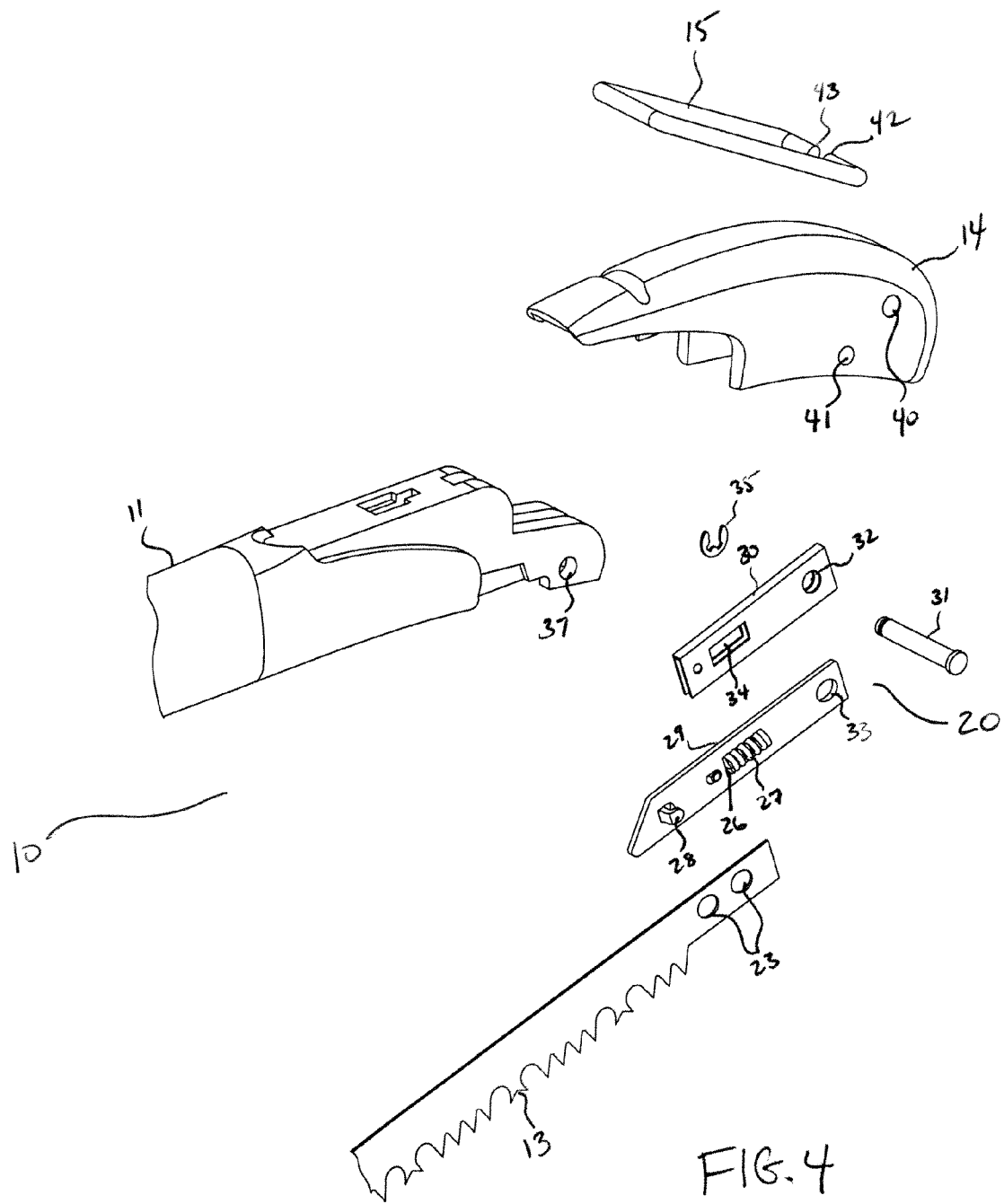
FIG. 4 illustrates a partial exploded view of the multi-purpose tool, according to an embodiment.

FIG. 4 illustrates a partial exploded view of the multi-purpose tool 10 including the components of the compensating clip 20, frame 11, bale 14, stake puller 15, and removable saw blade 13 with the at least one hole 23, prior to assembly. As illustrated in FIG. 4, the compensating clip 20 includes the center section 29 which includes the clip hook 28, spring 27 within opening 26, and a hole 33. The retention structure 30 includes an opening 34 and hole 32. The opening 34 coincides with the opening 26 of the center section 29, and the hole 32 coincides with the hole 33 of the center section 29, when the retention structure 30 is placed over the center section 29. The stake puller 15 may include two ends 42, 43 that may respectively be inserted into each side of hole 41 of the bale 14 and inserted into each side of hole 37 in frame 11. As a result, the ends 42, 43 of the stake puller 15 may act as an axis of rotation for the bale 14.

Figure 5:
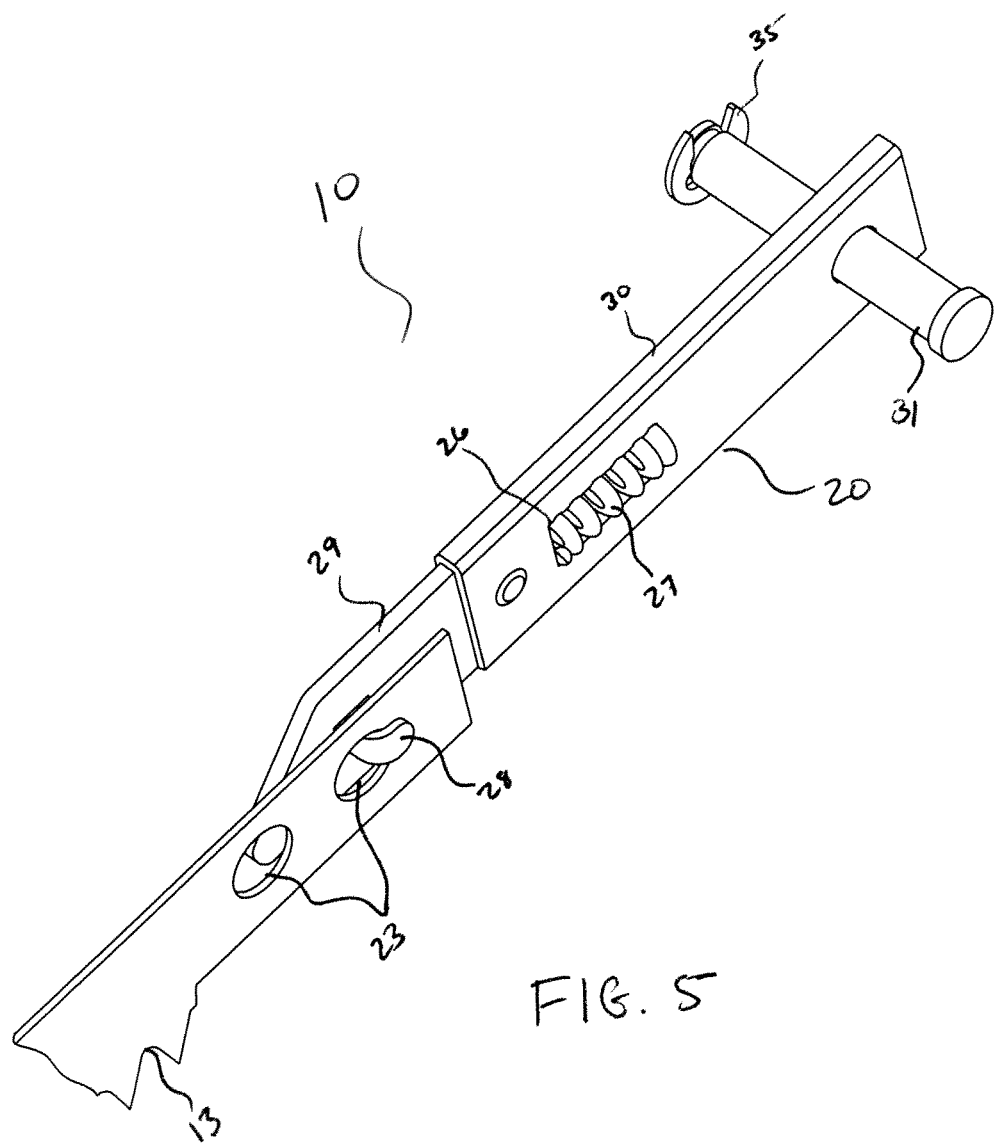
FIG. 5 illustrates an example of the compensating clip assembly of the multi-purpose tool, according to an embodiment.
Figure 6:
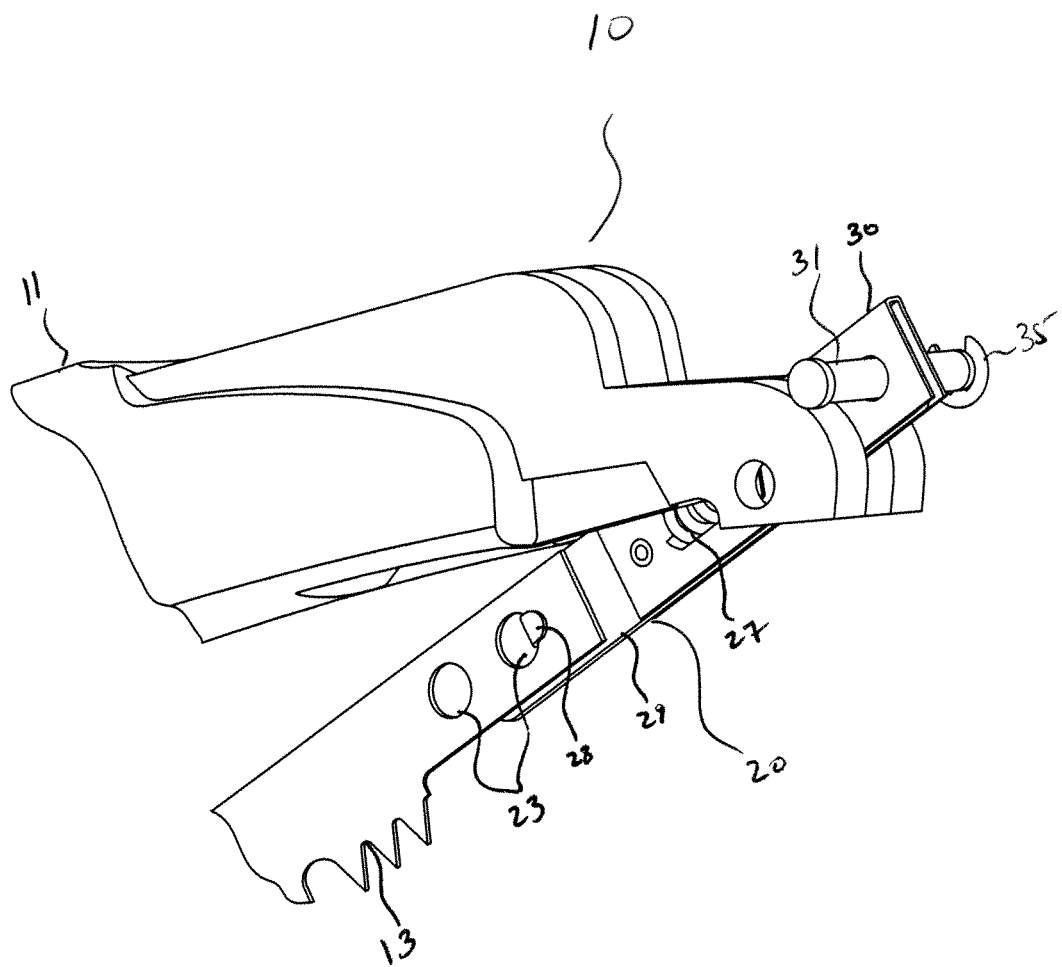
FIG. 6 illustrates another example of the compensating clip assembly of the multi-purpose tool, according to another embodiment.

As further illustrated in FIG. 4, the multi-purpose tool 10 may also include a cylindrical shaped pin 31 configured to attach the compensating clip 20 to the multi-purpose tool 10. In one embodiment, the pin 31 is configured to be inserted through the hole 40 of the bale 14, the hole 32 of the retention structure 30, and the hole 33 of the center section 29. The pin 31 may then be locked into place by a washer 35. FIGS. 5 and 6 illustrate the elements of the compensating clip 20 in their assembled form, according to one embodiment.

In some embodiments, the compensating clip 20 may include additional features and components which may enhance the assembly and integrity of the assembly.

Thus, embodiments of the invention provide a multi-purpose tool 10 which can be used as a saw and that overcomes manufacturing tolerances in the saw blades resulting from production lot variations, different blade manufacturers, and tolerances in the manufacture of the multi-purpose tool 10. Therefore, in some embodiments, compensating clip 20 may be considered a tolerance compensator mechanism. Additionally, in some embodiments, the multi-purpose tool can be used as an axe, mallet, and/or stake puller.

It should be noted that compensating clip 20 is a tolerance compensator mechanism that can be used in other tools and products that require a "self-adjusting" feature or mechanism to overcome tolerances and other variations for proper assembly and function.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A saw comprising:
a frame;
a handle connected to the frame;
a saw blade extending between the handle and the frame;
a compensating clip; and
a bale connecting the compensating clip to the frame;
wherein a first end of the saw blade is fixedly mounted to one of the handle and the frame, and a second end of the saw blade is linked to the other of the handle and the frame by the compensating clip;
wherein the compensating clip includes:
a retention structure;
a clip member received by the retention structure, the clip member having a clip hook removably received in a hole in the second end of the saw blade; and
a compensator spring acting between the clip member and the retention structure to apply a tensioning force to the saw blade;
wherein the bale is pivotally mounted to the frame to rotate relative to the frame about a bale rotation axis, and the compensating clip is pivotally mounted to the bale to rotate relative to the bale about a clip rotation axis spaced apart from the bale rotation axis, wherein the bale is rotatable to a closed position such that tension is applied to the saw blade by way of the compensating clip; and
wherein the retention structure, the clip member, and the compensator spring of the compensating clip rotate with the bale relative to the frame when the bale is rotated to the closed position; wherein the retention structure and the clip member include respective overlapping openings, and the compensator spring is received in the overlapping openings; and wherein the retention structure is a U-shaped bracket defining a central slot, and the clip member is an elongated plate received by the central slot of the retention structure.

2. The saw according to claim 1, wherein the retention structure and the clip member include respective holes, and the clip rotation axis is defined by a cylindrical pin extending through the respective holes in the retention structure and the clip member.

3. The saw according to claim 1, wherein the clip hook is integrally formed with the clip member.

4. The saw according to claim 1, wherein the first end of the saw blade includes at least one hole, and the first end of the saw blade is fixedly mounted to the one of the handle and the frame by a removable pin extending through a selected one of the at least hole in the first end of the saw blade.

5. The saw according to claim 4, wherein the first end of the saw blade includes two holes.

6. The saw according to claim 1, wherein the frame includes a channel for storing at least one saw blade.

7. The saw according to claim 1, wherein the compensator spring directly engages the clip member and the retention structure.

8. A saw comprising:
a frame having a proximal end and a distal end;
a handle mounted to the proximal end of the frame;
a bale pivotally mounted to the distal end of the frame for rotation relative to the frame about a bale rotation axis;
a compensating clip pivotally mounted to the bale for rotation relative to the bale about a clip rotation axis, the compensating clip including a retention structure, a clip member received by the retention structure, and a compensator spring acting between the clip member and the retention structure; and
a saw blade having a first end removably mounted to the handle and a second end removably mounted to the compensating clip;
wherein the bale is rotatable relative to the frame to a closed position such that tension is applied to the saw blade by way of the compensator spring, wherein the retention structure, the clip member, and the compensator spring of the compensating clip rotate with the bale relative to the frame when the bale is rotated to the closed position; wherein the retention structure and the clip member include respective overlapping openings, and the compensator spring is received in the overlapping openings; and wherein the retention structure is a U-shaped bracket defining a central slot, and the clip member is an elongated plate received by the central slot of the retention structure.

9. The saw according to claim 8, wherein the compensating clip is aligned with the saw blade when the bale is in the closed position.

10. The saw according to claim 8, wherein the second end of the saw blade includes at least one hole and the compensating clip includes a clip hook removably received by a selected one of the at least one hole to mount the second end of the saw blade to the compensation clip.

11. The saw according to claim 10, wherein the second end of the saw blade includes two holes.

12. The saw according to claim 8, wherein the compensator spring is a coiled compression spring.

13. The saw according to claim 8, wherein the compensator spring directly engages the clip member and the retention structure.

14. The saw according to claim 9, wherein the bale is rotatable relative to the frame to an open position, and the compensating clip is not aligned with the saw blade when the bale is in the open position.

* * * * *